(12) United States Patent
Ito

(10) Patent No.: US 12,116,095 B2
(45) Date of Patent: *Oct. 15, 2024

(54) ADAPTER, ELECTRONIC DEVICE, AND METHOD FOR TRANSPORTING ELECTRONIC DEVICE

(71) Applicant: FULLDEPTH CO., LTD., Tokyo (JP)

(72) Inventor: Shohei Ito, Tokyo (JP)

(73) Assignee: FULLDEPTH CO., LTD., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 17/959,623

(22) Filed: Oct. 4, 2022

(65) Prior Publication Data

US 2023/0024776 A1    Jan. 26, 2023

Related U.S. Application Data

(63) Continuation of application No. 16/624,522, filed as application No. PCT/JP2018/023661 on Jun. 21, 2018, now Pat. No. 11,505,295.

(30) Foreign Application Priority Data

Jun. 22, 2017 (JP) .................. 2017-122158

(51) Int. Cl.
*B63G 8/00* (2006.01)
*G02B 6/42* (2006.01)
*H04B 10/25* (2013.01)

(52) U.S. Cl.
CPC ........... *B63G 8/001* (2013.01); *G02B 6/4251* (2013.01); *H04B 10/25* (2013.01); *B63G 2008/007* (2013.01)

(58) Field of Classification Search
CPC .. H04B 10/25; B63G 8/001; B63G 2008/007; G02B 6/4251
USPC ........................................... 29/426.1
See application file for complete search history.

(56) References Cited

U.S. PATENT DOCUMENTS

| | | | | |
|---|---|---|---|---|
| 6,223,675 | B1 * | 5/2001 | Watt | E21B 41/04 405/190 |
| 6,257,162 | B1 * | 7/2001 | Watt | B63G 8/001 114/221 R |
| 2011/0114006 | A1 * | 5/2011 | Jung | G02B 6/4471 385/75 |
| 2012/0328372 | A1 * | 12/2012 | Hawkes | B65H 75/4484 405/177 |

(Continued)

FOREIGN PATENT DOCUMENTS

EP    2327622 A1    6/2011
JP    S61-200089 A    9/1986
(Continued)

OTHER PUBLICATIONS

Aug. 7, 2018 Search Report issued in International Patent Application No. PCT/JP2018/023661.
(Continued)

*Primary Examiner* — Dalzid E Singh
(74) *Attorney, Agent, or Firm* — Oliff PLC

(57) ABSTRACT

An adapter includes a waterproof container, a photoelectric conversion device housed in the waterproof container and connected to an optical cable, and an attachment structure provided at the waterproof container, for use in detachably attaching the adapter to an ROV.

9 Claims, 1 Drawing Sheet

(56) References Cited

U.S. PATENT DOCUMENTS

2014/0023365 A1* 1/2014 Xi .................. G02B 6/3816
                                                        398/58
2015/0307174 A1  10/2015 Zediker et al.
2016/0375963 A1* 12/2016 Tønnessen .......... B63B 21/66
                                                        701/21
2018/0297677 A1  10/2018 Sakaue et al.

FOREIGN PATENT DOCUMENTS

JP      2017-71265 A    4/2017
WO      01/21476 A1     3/2001

OTHER PUBLICATIONS

Mar. 17, 2020 Office Action issued in Japanese Patent Application No. 2017-122158.
Feb. 25, 2021 Search Report issued in European Patent Application No. 18821146.0.
Jul. 2, 2021 Office Action issued in Chinese Patent Application No. 201880051812.5.
Apr. 14, 2022 Office Action issued in Chinese Patent Application No. 201880051812.5.
Jul. 4, 2023 Office Action issued in European Patent Application No. 18821146.0.

* cited by examiner

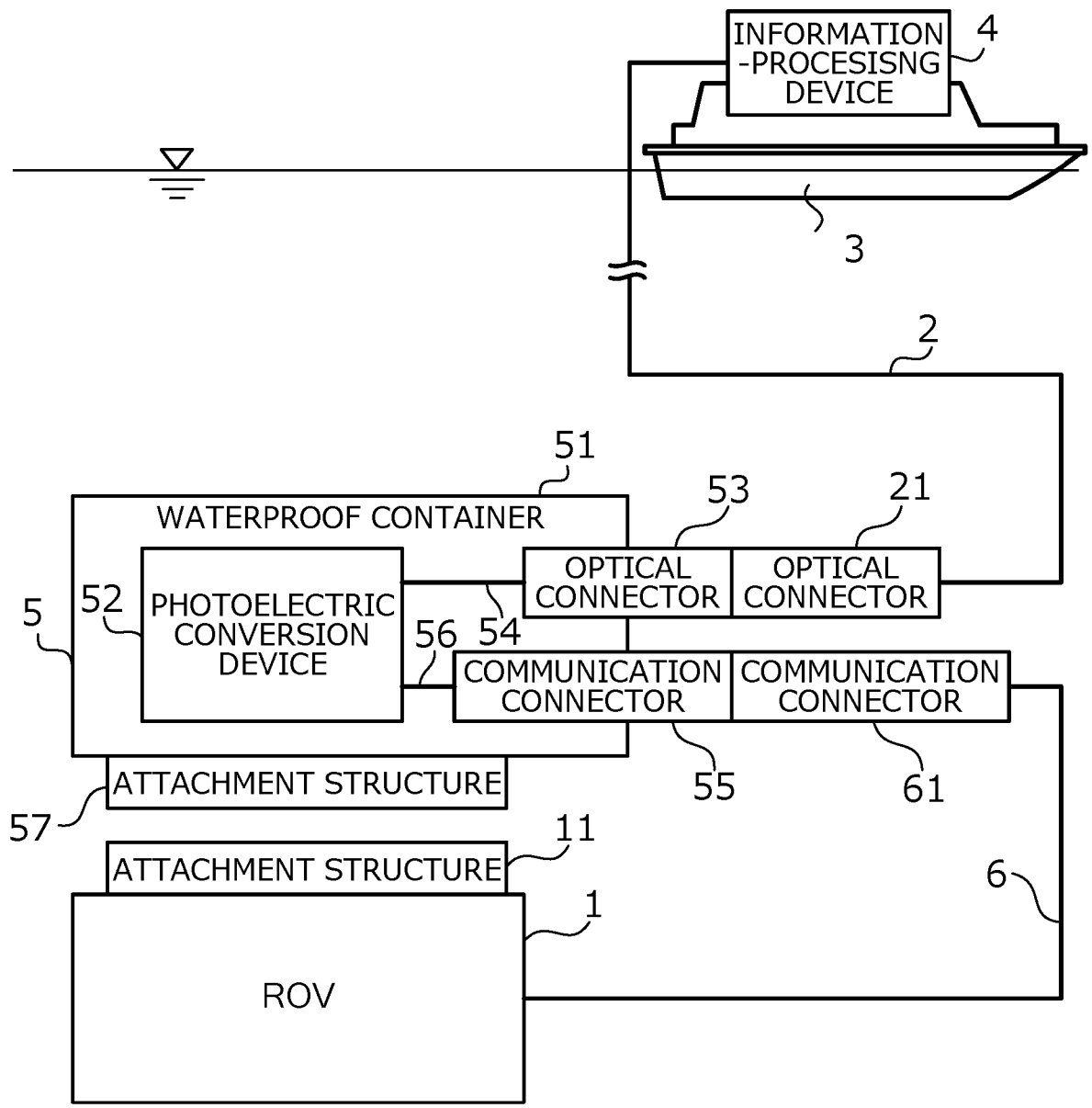

ADAPTER, ELECTRONIC DEVICE, AND METHOD FOR TRANSPORTING ELECTRONIC DEVICE

CROSS-REFERENCE TO RELATED APPLICATION(S)

This application is a continuation of U.S. application Ser. No. 16/624,522 filed Dec. 19, 2019, which is a National Stage Entry application of Application PCT/JP2018/023661 filed on Jun. 21, 2018, and is based on and claims priority under 35 U.S.C. 119 from Japanese Patent Application No. 2017-122158 filed on Jun. 22, 2017. The contents of the above applications are incorporated herein by reference.

TECHNICAL FIELD

The present invention relates to an adapter for connecting an electronic device used underwater to another electronic device so that the electronic devices can communicate with each other via an optical cable.

BACKGROUND ART

Known in the art is a remotely operated vehicle (ROV) for unmanned use in underwater exploration. Commonly, a ROV is connected to a surface device via an optical cable. An image signal generated by a camera mounted to the ROV is converted to an optical signal by a correspondent photoelectric conversion device, and the optical signal is sent to the surface device (for example, refer to Patent Document 1).

PRIOR ART DOCUMENT

Patent Document

Patent Document 1: JP S61-200089 A1

SUMMARY OF THE INVENTION

Problems to be Solved by the Invention

An optical cable is attached to a main body of a ROV by an optical cable connector provided at one end of the cable. Conventionally, prior to transportation of the ROV the optical cable is detached from the main body of the ROV. However, detachment of the optical connector can give rise to a problem in that an end face of the optical cable may become contaminated with dirt, resulting in optical communication errors or complete disablement of optical communication.

The present invention has been made in view of the aforementioned circumstances, and has as its object the prevention of problems caused by detachment of an optical cable from an electronic device such as a ROV.

Means for Solving the Problems

To solve the problem described above, an adapter according to the present invention is used to connect an optical cable to an electronic device used underwater, and the adapter comprises: a photoelectric conversion device; and an attachment structure for detachably attaching the adapter to the electronic device, wherein: the photoelectric conversion device comprises a waterproof structure, a first connector used to connect the optical cable to the photoelectric conversion device, and a second connector used to connect the photoelectric conversion device to the electronic device; and the second connector is configured such that the second connector is detachable from the electronic device.

The first connector may be integrally connected to the optical cable.

The second connector may send or receive a signal to or from the electronic device in a non-contact manner.

The electronic device may be an unmanned vehicle.

An electronic device used underwater according to the present invention comprises: an adapter used to connect an optical cable to the electronic device; and an attachment structure for detachably attaching the adapter to the electronic device, wherein: a photoelectric conversion device included in the adapter comprises a waterproof structure, a first connector used to connect the optical cable to the photoelectric conversion device, and a second connector used to connect the photoelectric conversion device to the electronic device; and the second connector is configured such that the second connector is detachable from the electronic device.

A method according to the present invention for transporting an electronic device used underwater, comprises: using an adapter that includes a photoelectric conversion device that comprises a waterproof structure, a first connector to which an optical cable is connected, and a second connector used to connect the photoelectric conversion device to the electronic device; detaching the electronic device from the second connector to separate the electronic device from the optical cable; and transporting the electronic device.

Effects of the Invention

The present invention has been made to prevent problems from arising as a result of detachment of an optical cable from an electronic device such as a ROV.

BRIEF DESCRIPTION OF THE DRAWINGS

FIG. 1 is a diagram showing an example of a configuration of adapter 5.

MODES FOR IMPLEMENTING THE INVENTION

1. Embodiment

FIG. 1 shows an example of a configuration of adapter 5 for connecting ROV 1 to information-processing device 4 provided on ship 3 via optical cable 2 so that ROV 1 can communicate with information-processing device 4. As shown in the FIGURE, adapter 5 is connected to information-processing device 4 provided on ship 3 via optical cable 2, and to ROV 1 via communication cable 6.

Herein, ROV 1 refers to a cabled and remotely operated unmanned vehicle; in other words, to an unmanned submersible, underwater robot, or underwater drone. ROV 1 is an example of an electronic device to which adapter 5 is detachably attached, and that is used under water. Specifically, ROV 1 includes a main body frame, an underwater camera for capturing an image underwater, an underwater light for providing light underwater, a propulsion device for propelling ROV 1, and a control device for controlling operation of ROV 1 (these features are not shown in the FIGURES). ROV 1 also includes attachment structure 11, which is provided at the main body frame, and which is used to detachably attach adapter 5 to ROV 1. Attachment structure 11 will be described later. In addition to the foregoing components, ROV 1 may include a GPS receiver, an electronic compass, a depth sensor, a sonar, a manipulator, and also a battery in a case that ROV 1 is not supplied with power from ship 3 via a power cable.

Adapter 5, which is detachably attached to ROV 1, includes: waterproof container 51; photoelectric conversion device 52, which is stored in waterproof container 51; optical connector 53, which enables communication between the inside and the outside of waterproof container 51; optical cable 54, which is used to connect optical connector 53 to photoelectric conversion device 52; communication connector 55, which enables communication between the inside and the outside of waterproof container 51; communication cable 56, which is used for connecting communication connector 55 to photoelectric conversion device 52; and attachment structure 57, which is provided either on the outer wall of waterproof container 51 or on a flange extending from the outer wall. Further, adapter 5 may be housed within the main body frame of ROV 1, or may be attached to the outside of the main body frame.

Waterproof container 51 may refer either to a pressure-resistant or pressure-equalizing container. Herein, the pressure-equalizing container is a container filled with a liquid or gel such as insulating oil. It is of note that in a modification, waterproof container 51 may be formed by covering the entire outer side of photoelectric conversion device 52 with a resin; namely, the outer side of device 52 may be resin-sealed.

Photoelectric conversion device 52 converts an optical signal sent from information-processing device 4 provided on ship 3 via optical cable 2 into an electrical signal, and sends the thus-converted electrical signal to ROV 1 via communication cable 6; and vice versa, photoelectric conversion device 52 converts an electrical signal sent from ROV 1 via communication cable 6 into an optical signal, and sends the optical signal to information-processing device 4 provided on ship 3 via optical cable 2. The signal sent from information-processing device 4 to ROV 1 refers to, for example, a control signal used to control the underwater camera, the underwater light, or the propulsion device of ROV 1. On the other hand, the signal sent from ROV 1 to information-processing device 4 refers to, for example, an image signal generated by the underwater camera of ROV 1.

Optical connector 53 is a member to which one end of optical cable 2, which extends from information-processing device 4 provided on ship 3, is connected. Specifically, optical connector 21 attached to one end of optical cable 2 is connected to optical connector 53. When optical connector 21 is connected to optical connector 53, an end face of an optical fiber integrated in optical cable 2 is brought into contact with an end face of an optical fiber integrated in optical cable 54. The diameter of the contact surface is, for example, 9 μm.

When optical connector 53 and optical connector 21 are connected to each other, any of an axial deviation, an angular deviation, or a gap may occur between the optical fibers, thereby resulting in a loss of optical connection. To obviate such a problem, optical connector 53 and optical connector 21 are connected to each other either by sleeve fitting or pin fitting. Herein, sleeve fitting refers to type of connection by which end faces of optical fibers are brought into contact with each other such that each of a cylindrical ferrule that covers each of optical fibers is inserted into a split sleeve having a C-shaped cross-section, with the ferrules facing each other. In contrast, herein, pin fitting refers to a type of connection by which end faces of optical fibers are brought into contact with each other such that fitting pins are inserted into pairs of holes formed in each of rectangular ferrules that covers each of optical fibers.

Communication connector 55 is a member to which one end of communication cable 6 that extends from ROV 1 is connected. Specifically, communication connector 61, which is attached to one end of communication cable 6, is connected to communication connector 55. Communication connector 55 is configured such that it can be detachably attached to communication connector 61. When communication connector 61 is connected to communication connector 55, a conductor included in communication cable 6 is electrically connected to a conductor included in communication cable 56. Communication connector 55 and communication connector 61 are, for example, male and female connectors. In this configuration, an end face of a pin of the male connector is, for example, 2 mm in diameter; and the diameter of an end face of a pin of communication connector 55 or 61 is larger in diameter than that of the contact surface of the optical fibers of optical connectors 53 and 21. Accordingly, a contract area of the end surface of the pin is larger than the contact surface of the optical fibers.

Attachment structure 57 is a structure for detachably attaching adapter 5 to ROV 1. Attachment structure 57 makes it possible for adapter 5 to be detachably attached to ROV 1, in cooperation with attachment structure 11 of ROV 1. Attachment methods include those requiring use of a tool and those not requiring use of a tool. The methods in which a tool is used include screw fitting. Where screw fitting is used, each of attachment structure 57 and attachment structure 11 corresponds to a through-hole for screw fitting. Alternatively, one of the structures corresponds to a through-hole for screw fitting, and the other corresponds to a screw hole. On the other hand, methods in which a tool is not used include: a method in which a lock hook is used; a method in which a latch lock is used; a method in which a fastener is used; a method in which a magnet is used; and a fitting method. In a case where a lock hook is used, each of attachment structure 57 and attachment structure 11 refers to a through-hole with which the lock hook is engaged. In a case where a latch lock is used, one of attachment structure 57 and attachment structure 11 corresponds to a latch bolt of the latch lock, and the other corresponds to a latch receiver into which the latch bolt is inserted. In a case where a fastener is used, one of attachment structure 57 and attachment structure 11 corresponds to an engaging portion of the fastener, and the other corresponds to an engaged portion. In a case that a magnet is used, one of attachment structure 57 and attachment structure 11 corresponds to a magnet, and the other corresponds to a magnetic member. In a case where the fitting method is employed, one of attachment structure 57 and attachment structure 11 corresponds to a convex part, and the other corresponds to a concave part.

It is of note that two or more of the foregoing attachment methods may be used in combination.

In contrast to the conventional ROV, ROV 1 to which adapter 5 is attached may be separated from optical cable 2 prior to transportation, by detaching communication connector 61 from communication connector 55 and detaching adapter 5 from ROV 1. This separation method makes detachment of optical connector 21 from optical connector 53 unnecessary when detaching optical cable 2 from ROV 1. By eliminating the necessity to detach optical connector 21 from optical connector 53, the problem of the prior art is overcome in that since connector 21 is not detached from optical connector 53, an end face of optical cable 2 is prevented from becoming contaminated with dirt, and hence communication errors or complete disablement of communication is obviated.

2. Modifications

The embodiment described above may be modified as described below. It is of note that one or more of the following modifications may be combined.

2-1. Modification 1

ROV 1 is an example of an electronic device to which adapter 5 is detachably attached, and that is used under water. Adapter 5 may be detachably attached to an electronic device for use underwater, other than ROV 1. For example, adapter 5 may be detachably attached to an unmanned vehicle that is towed under water. Alternatively, adapter 5 may be detachably attached to a communication device such as a relay device, a measuring device such as an underwater camera or a water quality meter, or an underwater civil engineering machine such as an underwater bulldozer.

2-2. Modification 2

Since optical connectors 53 and 21 need not be separated from each other prior to transportation of ROV 1, photoelectric conversion device 52 and optical cable 2 may be made integral. Methods for integrally connecting photoelectric conversion device 52 and optical cable 2 include methods in which one of optical connectors 53 and 21 is fixed to the other by use of a fixing member, and methods in which one end of optical cable 2 is connected directly to photoelectric conversion device 52, without optical connector 53 or 21. The former methods include bonding with an adhesive and screw fixing. When bonding with an adhesive is employed, it becomes difficult to separate optical connectors 53 and 21, and forced separation thereof may cause them to be irreparably damaged. In a case where screw fixing is employed, a tool is required to separate optical connectors 53 and 21. On the other hand, the latter methods include a method in which a cable penetrator is provided at a wall of waterproof container 51, through which optical cable 2 passes, and a method in which a through-hole is formed in a wall of waterproof container 51, through which optical cable 2 passes, and a gap between the through-hole and optical cable 2 is filled with a resin. The cable penetrator herein refers to an instrument that enables communication between the inside and the outside of waterproof container 51, and allows optical cable 2 to pass therethrough, while keeping waterproof container 51 sealed. This cable penetrator has an advantage in that it is substantially cheaper to use than optical connectors 53 and 21.

It is of note that two or more of the foregoing methods may be used in combination.

2-3. Modification 3

Photoelectric conversion device 52 may send, receive, or exchange a signal with ROV 1 in a non-contact manner. In other words, photoelectric conversion device 52 may be wirelessly connected to ROV 1. Photoelectric conversion device 52 and ROV 1 may exchange a signal by use of an existing near field communication technology such as a Near Field Communication (NFC).

2-4. Modification 4

To detachably attach adapter 5 to ROV 1, attachment structure 57 of adapter 5 may be omitted. In such a case, methods for detachably attaching adapter 5 to ROV 1 include methods involving use of a tool, and methods not involving use of a tool. Methods in which a tool is used include one in which a clamp is employed to hold waterproof container 51 of adapter 5. In a case that a clamp is used, attachment structure 11 of ROV 1 corresponds to the clamp. On the other hand, methods in which a tool is not used include one in which waterproof container 51 of adapter 5 is fixed to the main body frame of ROV 1 by use of a band with a hook-and-loop fastener, and one in which waterproof container 51 of adapter 5 is fitted into a hole formed at the main body frame of ROV 1. In a case that the former method is used, attachment structure 11 of ROV 1 corresponds to the band, and in a case where the latter method is used, attachment structure 11 of ROV 1 corresponds to the hole.

2-5. Modification 5

Waterproof container 51 may contain a battery that supplies power to ROV 1. The battery may supply power to ROV 1 either by wire or wirelessly. In a case that the battery supplies power to ROV 1 by wire, a power cable extending from the battery may be connected to ROV 1 via a power connector that enables communication between the inside and the outside of waterproof container 51, or via a cable penetrator. In a case where the battery supplies power to ROV 1 wirelessly, a known non-contact power supply method may be used.

2-6. Modification 6

Communication connector 55 may be made integral with waterproof container 51. In other words, a part of waterproof container 51 may be formed as a waterproof connector. Alternatively, communication connector 55 may have a structure that is formed to be directly connected to ROV 1, without use of either communication connector 61 or communication cable 6. Alternatively, one of communication connector 55 and communication connector 61 may be a spring connector (or a spring pin connector).

2-7. Modification 7

In the above embodiment, communication connector 55 is attached to adapter 5, and by connecting communication connector 61 to communication connector 55, communication between photoelectric conversion device 52 and ROV 1 is enabled. However, the communication connector need not necessarily be attached to adapter 5. For example, the communication connector may be attached to a housing of ROV 1. By connecting, to the communication connector, another communication connector that is attached to one end of communication cable 56 extending from photoelectric conversion device 52, communication between photoelectric conversion device 52 and ROV 1 is enabled. In such a case, the communication connector attached to one end of communication cable 56 extending from photoelectric conversion device 52 is an example of a "second connector" according to the present invention.

DESCRIPTION OF THE REFERENCE NUMERALS

1 . . . ROV, 2 . . . optical cable, 3 . . . ship, 4 . . . information-processing device, 5 . . . adapter, 6 . . . communication cable, 11 . . . attachment structure, 21 . . . optical connector, 51 . . . waterproof container, 52 . . . photoelectric conversion device, 53 . . . optical connector 54 . . . optical cable, 55 . . . communication connector, 57 . . . attachment structure, 61 . . . communication connector

What is claimed is:

1. An adapter used to connect an optical cable to an electronic device used underwater, the adapter comprising:
 a photoelectric conversion device; and
 an attachment structure for detachably attaching the adapter to the electronic device, wherein:
 the photoelectric conversion device comprises:

a waterproof structure;
a first connector used to connect the optical cable to the photoelectric conversion device; and
a second connector used to connect the photoelectric conversion device to the electronic device; and
the second connector is configured such that the second connector is detachable from the electronic device,
wherein the second connector is a second communication connector connectable to a first communication connector provided at an end of a communication cable extending from the electronic device, the first communication connector and the second communication connector being male and female connectors.

2. The adapter according to claim 1, wherein the first connector is integrally connected to the optical cable.

3. The adapter according to claim 1, wherein the electronic device is an unmanned vehicle.

4. An electronic device used underwater, comprising:
an adapter used to connect an optical cable to the electronic device; and
an attachment structure for detachably attaching the adapter to the electronic device, wherein:
a photoelectric conversion device included in the adapter comprises:
a waterproof structure;
a first connector used to connect the optical cable to the photoelectric conversion device, and
a second connector used to connect the photoelectric conversion device to the electronic device, the second connector being configured such that the second connector is detachable from the electronic device; and
the second connector is a second communication connector connectable to a first communication connector provided at an end of a communication cable extending from the electronic device, the first communication connector and the second communication connector being male and female connectors.

5. The adapter according to claim 4, wherein the first connector is integrally connected to the optical cable.

6. The adapter according to claim 4, wherein the electronic device is an unmanned vehicle.

7. A method for transporting an electronic device used underwater, comprising:
using an adapter that includes a photoelectric conversion device that comprises a waterproof structure, a first connector to which an optical cable is connected, and a second connector used to connect the photoelectric conversion device to the electronic device;
detaching the electronic device from the second connector to separate the electronic device from the optical cable; and
transporting the electronic device, wherein
the second connector is a second communication connector connectable to a first communication connector provided at an end of a communication cable extending from the electronic device, the first communication connector and the second communication connector being male and female connectors.

8. The method according to claim 7, wherein the first connector is integrally connected to the optical cable.

9. The method according to claim 7, wherein the electronic device is an unmanned vehicle.

* * * * *